United States Patent [19]

Godbey et al.

[11] Patent Number: 5,565,497
[45] Date of Patent: Oct. 15, 1996

[54] DISPERSANT FOR FILLED, RIGID CELLULAR POLYMERS

[75] Inventors: Judy A. Godbey, Tampa, Fla.; Jyothi S. Pisipati, Wexford, Pa.

[73] Assignee: The Celotex Corporation, Tampa, Fla.

[21] Appl. No.: 569,827

[22] Filed: Dec. 7, 1995

[51] Int. Cl.$^6$ ............................ C08G 18/32; C08G 18/34
[52] U.S. Cl. ..................... 521/131; 521/98; 521/132; 521/143; 521/146; 521/172; 521/174; 521/181
[58] Field of Search .................................. 521/131, 132, 521/172, 174, 98, 146, 143, 181

[56] References Cited

U.S. PATENT DOCUMENTS

| | | | |
|---|---|---|---|
| 3,625,872 | 12/1971 | Ashida | 260/2.5 |
| 4,289,892 | 9/1981 | Soch | 560/26 |
| 4,438,221 | 3/1984 | Fracalossi et al. | 521/55 |
| 4,621,106 | 11/1986 | Fracalossi et al. | 521/130 |
| 4,795,763 | 1/1989 | Gluck et al. | 521/99 |
| 4,960,804 | 10/1990 | Doerge | 521/130 |
| 5,023,280 | 6/1991 | Haas et al. | 521/106 |
| 5,149,722 | 9/1992 | Soukup | 521/99 |
| 5,162,384 | 11/1992 | Owens et al. | 521/110 |
| 5,166,182 | 11/1992 | Blanpied | 521/50 |
| 5,210,105 | 5/1993 | Paquet et al. | 521/99 |
| 5,210,106 | 5/1993 | Dams et al. | 521/110 |
| 5,238,970 | 8/1993 | DeVos | 521/114 |
| 5,286,759 | 2/1994 | Smits et al. | 521/131 |
| 5,290,823 | 3/1994 | Volkert | 521/131 |
| 5,304,320 | 4/1994 | Barthelemy et al. | 252/67 |
| 5,373,026 | 12/1994 | Bartz et al. | 521/82 |

FOREIGN PATENT DOCUMENTS

WO95/15356  6/1995  WIPO ............................ C08J 9/00

*Primary Examiner*—Morton Foelak
*Attorney, Agent, or Firm*—Charles W. Vanecek

[57] ABSTRACT

A process for the manufacture of a closed cell, rigid, polymer foam from polymer foam-forming ingredients containing a filler which comprises:

(a) dispersing the filler in at least a portion of the foam-forming ingredients to form a filled dispersion, a fluorochemical surfactant being incorporated in the foam-forming ingredients either before, during or after the dispersing operation to form a dispersion containing a filler and a fluorochemical surfactant, (b) mixing the dispersion formed in step (a) with any remaining foam-forming ingredient or ingredients, and (c) foaming and curing the resultant foam-forming composition.

The fluorochemical surfactant improves the stability, flowability and mixing of the dispersion during the foam production.

17 Claims, No Drawings

DISPERSANT FOR FILLED, RIGID CELLULAR POLYMERS

FIELD OF THE INVENTION

This invention relates to the production of filled-foam insulating products, particularly polyurethane and polyisocyanurate foams.

DESCRIPTION OF THE PRIOR ART

The usefulness of foamed plastic materials in a variety of applications is well known. Rigid polyurethane and polyisocyanurate foams, for instance, are widely used as insulating structural members. It is often desirable to reduce the polymer content and improve the properties of these foams by the addition of inorganic fillers. Unfortunately, the incorporation of fillers in insulative foam structures can be beset with problems involving difficultly handleable viscosities and poor mixing of the foam-forming ingredients. The resultant foams may be inhomogeneous and have inferior physical properties. For example, U.S. Pat. No. 4,795,763, which is directed to the use of carbon black for improved insulation value, discloses that a failure to properly disperse the carbon black can result in clogging of the foam production equipment and the production of foam whose carbon black is clustered at the foam cell struts or highly agglomerated in a portion of the cell walls to yield little or no improvement in insulation value. It is accordingly highly desirable to find ways to simply and economically disperse filler material in the ingredients employed in the production of rigid foam plastic, and to convert the filler-containing foamable mixture to a foam having a combination of desirable properties, including an advantageous insulating value.

OBJECTS OF THE INVENTION

It is therefore an object of the present invention to produce closed cell, rigid foam plastic, especially polyurethane and polyisocyanurate foam, which contains a well-dispersed filler, and exhibits overall good properties, including excellent thermal insulative properties, good dimensional stability, thermal resistance and compressive strength and acceptable friability.

It is another object of the present invention to provide an improved method for the production of filled, rigid, highly insulating foam plastic, wherein the filler does not clog the foam production equipment and becomes uniformly dispersed in the cells of the foam plastic product.

It is a further object of the present invention to provide an additive which helps to disperse filler material in the ingredients employed in the production of filled, closed cell, rigid foams, and to improve the filled ingredients' flowability so as to effect better mixing and reactivity of the ingredients and thereby bring about the production of superior foams.

It is still another object of the present invention to provide an improved method to aid in the dispersing of a filler in a foam-forming composition and/or to improve the stability, flowability and mixing of the dispersion during the foam formation.

These and other objects and advantages of the present invention will become more apparent by reference to the following detailed description.

SUMMARY OF THE INVENTION

The above objects have been achieved by the use of a fluorochemical surfactant to aid in the incorporation of filler material into closed cell, rigid polymer foams. The fluorochemical compound helps to improve flowability and mixing of the filler-containing foamable composition and to bring about a uniform dispersion of the filler in the composition. The fluorochemical, which suitably is a nonionic compound, may be used as the sole filler dispersant in the foam system but in an advantageous embodiment of the invention it is used in combination with at least one other filler dispersant. The fluorochemical additive is included in the foam composition in an amount which facilitates the incorporation and enhances the effectiveness of the added filler material in rigid foamed plastics.

The filler materials which are used in accordance with this invention to produce the rigid cellular compositions may be selected from a wide variety of inert, non-reactive substances, including particulate clays, carbons, metals, minerals, polymeric materials and diverse chemical compounds and mixtures thereof. Both organic and inorganic fillers may be used. A preferred class of fillers of the invention consists of those, such as carbon black, which can reduce the thermal conductivity of the rigid foams.

In the broadest aspects of the present invention, the rigid foamed plastic materials may be any such materials described in the prior art. Examples of these materials are polyurethane, polyisocyanurate, polyurea, polyolefin, polystyrene, phenol-formaldehyde, epoxy and other polymeric foams. The invention finds greatest utility when the foamed plastics are of the rigid type used to provide high efficiency insulation, especially rigid polyurethane and polyisocyanurate foams.

In accordance with the inventive process, the solid, particulate, and insoluble filler material is added to and dispersed in one or more of the foam-forming ingredients before foaming. The dispersion medium may advantageously include a foamable polymer or one or more precursors of a foamable polymer. In this connection, reactive components which react together during or after foaming to form a foamable polymer are regarded as precursors of a foamable polymer. Examples of suitable dispersion media are the polyol and/or polyisocyanate component in the case of polyurethane and polyisocyanurate foams. Incorporation of the fluorochemical surfactant in the particulate dispersion improves its processability during the foam-forming operation and the properties of the resultant filled foam.

The process for the manufacture of the filled foams typically involves the formation of fine particle dispersions by in situ reduction, e.g. by grinding, of the filler material to small particle sizes, and simultaneous distribution of the material in one or more of the foam forming ingredients. Incorporation of the fluorochemical surfactant during the process, e.g. during or after the grinding and dispersing step, is found to facilitate dispersion of the filler and/or foam production by reducing viscosity and improving mixing of the foam-forming composition, and to improve foam properties, e.g. insulation value.

DETAILED DESCRIPTION OF THE INVENTION

In accordance with the present invention, there is provided a filled polymeric foam comprising a fluorochemical surfactant which enhances the compatibility and dispersion of the filler in the foam-forming mixture and resultant foam. The surfactant compound can be represented broadly by the chemical structure

wherein $R_f$ is a fluorocarbon group and X is a group which solubilizes the compound in the foam-forming composition. The X group is advantageously organophilic for use in the predominantly nonaqueous systems of the invention. The oil solubility of nonionic fluorochemical surfactants of the invention makes them extremely surface active in the foam system. The fluorochemical surfactant of the invention can be prepared by various known methods involving the reaction of precursor fluorine-containing compounds with compounds which will yield the solubilizing portion of the surfactant, such as polyether moieties.

A class of fluorochemical surfactants suitable for use in the present invention are fluoroaliphatic oligomers, such as those represented by the following general formulae:

$(R^1{}_f)_m Q[RQ'A]_n$

$[(R^1{}_f)_m Q[RQ'A]_n]_z$ wherein $R^1{}_f$ is a fluoroaliphatic group R is a water solubilizing divalent organic group free of functional groups containing active hydrogen atoms, such as poly(oxyalkylene) or alkylene Q is a linkage through which $R^1{}_f$ and R radicals are covalently bonded together, A is a monovalent terminal organic group, A' is A or a valence bond, with the proviso that at least one A' is a valence bond connecting a Q-bonded R group to another Q, Q' is a linkage through which A, or A', and R are covalently bonded together, m is an integer of at least 2, and can be high as 25 or higher, n is an integer of at least 2, and can be as high as 60 or higher, and z is an integer of 2 or higher, and can be as high as 30 or higher. Specific examples of fluorochemical surfactants are described in U.S. Pat. Nos. 3,787,351 and 4,668,406, which descriptions are incorporated herein by reference.

Examples of suitable nonionic fluorochemical surfactants are fluorinated alkyl alkoxylates and fluorinated alkyl esters. Fluoroaliphatic oligomers are commercially available from Minnesota Mining and Manufacturing Company, St. Paul, Minn.

The fluorochemical surfactant may be broadly used to help disperse the state-of-the art inert fillers of organic or inorganic nature which have been identified as suitable additives for rigid foams. Preferably used fillers of the invention are the inorganic ones such as the basically known, commonly applied fillers, reinforcing agents, weighting agents, agents for improving the abrasion behavior in paints, coating agents, flame retarding agents, and so forth. In the context of the invention, inorganic fillers are also understood to include inorganic pigments known per se. The invention generally includes any finely divided, solid, particulate,' insoluble and non-reactive additive material, such as those commonly used in foams as filler or extender material. Examples of such additive materials are diatomaceous earth, barytes, litharge, aluminum flakes and powder, flake graphite, bentonite, montmorillonite, kaolin, attapulgus clay, calcium silicate, magnesium carbonate, calcium oxide and hydroxides, calcium sulphate, iron oxides, aluminum oxides and hydroxides, calcium carbonate, glass flakes and fibers, mica, hydrated calcium silicate, talcum, silicas, fly ash, carbon black, titanium dioxide, lead oxide, etc.

Carbon black is a preferred filler of the invention. The carbon black may be any of the different kinds available, such as lampblack, channel black, gas furnace black, oil furnace black and thermal black. Particularly suitable carbon blacks are non-electroconductive and have an average particle diameter which is preferably greater than about 20 and more preferably greater than about 30, nm. The carbon black material suitably has a specific surface area which is preferably less than about 200, more preferably less than about 142 and most preferably less than about 100, $m^2/g$. Pelleted types of carbon blacks have been found especially useful for large-scale processing.

A preferred carbon black is a standard rubber-grade carbon black falling under the classification of ASTM-550. This small-particle, high structured black provides highly stable dispersions during processing. Its high structure serves to reduce grinding time but still produces a fine particle size distribution. Examples of preferred ASTM-550 grade carbon blacks are pelleted products of Columbian Chemicals Company, sold under the trademarks Raven 520 and 410, and of Cabot Corporation, sold under the trademark Black Pearls 280.

Thermal blacks of the invention are described in Bartz et al. U.S. Pat. No. 5,373,026, which is incorporated herein by reference. Although thermal blacks of any particle size may be used, various advantages, as explained in Bartz et al., may be gained from those having a particle size which is greater than 150 nanometers and more preferably is about 200 to about 500 nanometers.

The amount of filler to be dispersed will depend on a number of factors, including the nature of the filler and foam system and the desired effect. The foam will profitably contain filler in an amount not less than about 0.05% by weight of the total foam-forming composition. Where, for example, the objective is to improve the insulating capability of the foam, a filler such as carbon black or aluminum powder will be present in a quantity sufficient to reduce the thermal conductivity of the foam below that of the corresponding foam without the filler. The level of filler in the insulating foams is desirably in the range from about 1.0 to 25 weight percent based on the weight of the polymer material in the foam. Typically, the amount of the preferred carbon black ranges from about 2% to 10% by weight of the solid foam polymer, preferably from 4% to 10%.

In the production of the inventive filled foams, the initial dispersion is produced by uniformly distributing the filler material in at least one of the foam-forming ingredients by any conventional dispersing apparatus. The filler is advantageously dispersed in at least one polymer-forming reactant or in a polymeric material. The fluorochemical dispersant may be added to the ingredients of the dispersion at any point before foaming. The addition may occur before, during or after dispersion of the filler(s) in the foam-forming composition. The dispersion(s) treated by the fluorochemical is thereafter mixed thoroughly with any remaining foam-forming ingredient(s) and the total composition is foamed and cured. For example, in the production of a filled polyurethane or polyisocyanurate foam, the filler may be dispersed in either the polyisocyanate or the polyol or both, with the fluorochemical being added to aid in the dispersion and/or to thereafter improve the flowability, mixing and reactivity of the filled foam-forming composition.

The fluorochemical dispersing agent is incorporated in the filler-containing dispersion in sufficient amount to improve the stability and flowability of the dispersion during the foaming process. The concentration of the fluorochemical is advantageously within the range of about 0.5 to 10 weight percent, preferably 0.75 to 5 weight percent, and more preferably 1 to 1.5 weight percent, based on the total weight of the filler.

The polymer compositions falling within the ambit of the present invention may be broadly selected from any of those which can be blown into foam. The rigid cellular polymers of the invention desirably have a closed cell content of at least about 75%, and more preferably of at least about 85% of the cells. The polymer compositions may be thermoplastic or thermoset. Suitable polymers include polyolefins, polyvinylchloride, alkenyl aromatic polymers, cellulosic polymers, polycarbonates, polyetherimides, polyamides, polyesters, polyvinylidene chloride, polymethylmethacrylate, polyurethanes, polyisocyanurates, phenolics, copolymers and terpolymers of the foregoing, polymer blends, rubber modified polymers, and the like. Suitable polyolefins include polyethylene and polypropylene. Suitable polyethylenes include those of high, medium, low, linear low, and ultra low density types.

One preferred plastic material comprises an alkenyl aromatic polymer. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. Regardless of composition, the alkenyl aromatic polymer material suitably comprises greater than 50 and preferably greater than 70 weight percent alkenyl aromatic monomeric units. Most preferably, the alkenyl aromatic polymer material is comprised entirely of alkenyl aromatic monomeric units. A preferred alkenyl aromatic polymer is polystyrene.

Other preferred plastic materials comprise all types of rigid polyurethane foams, such as closed-cell PIR, PUR, and mixed PUR/PIR foams, including appliance and boardstock foams used for spraying, roofing, insulation, etc. The polyurethane and polyisocyanurate foams comprise the reaction products in the presence of a foaming agent of polyisocyanates and polyfunctional, active hydrogen-containing compounds (hereinafter called "isocyanate-reactive compounds"), especially polyhydroxyl compounds. In the manufacture of these foams, it is common practice to utilize two preformulated components, commonly called the A-component and the B-component. Typically, the A-component contains the isocyanate compound that must be reacted with the polyol of the B-component to form the foam, and the balance of the foam-forming ingredients are distributed in these two components or in yet another component or components. The fluorochemical additive is advantageously used to help disperse the filler material, which preferably is carbon black, in one or the other of these components. Advantageously, the fluorochemical helps to disperse the carbon black particles in the polyisocyanate and the resultant dispersion may then be combined with any other A-component ingredient(s) and the remaining components. The reaction may be carried out in the presence of catalysts, auxiliaries and additives as required (e.g., a surfactant).

The polyisocyanate component employed in the preparation of the filled rigid foams of the invention can be any of the polyisocyanates known to be useful in the art of polymer formation. Suitable organic polyisocyanates include aliphatic, cycloaliphatic, araliphatic, aromatic and heterocyclic polyisocyanates and combinations thereof characterized in having two or more isocyanate (NCO) groups per molecule. Aromatic polyisocyanates are especially preferred. The viscosity of the polyisocyanates suitably is in the range of 100 to 5000 centipoise at 25° C.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methylcyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylene polyphenyl polyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanates, 2,4'- 4 4'- and 2 2-biphenyl diisocyanates, 2,2'- 2,4'- and 4,4'- diphenylmethane diisocyanates, polymethylene polyphenyl polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4' and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylene polyphenyl polyisocyanates (polymeric MDI), and mixtures of the above preferred isocyanates.

Most particularly preferred are the polymeric MDI's. Preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. Especially high quality carbon black-filled foams have been produced from polymeric MDI's having a viscosity above 1000, and preferably between about 1700–2500, centipoise at 25° C.

Highly useful organic polyisocyanates are the isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

In addition to the polyisocyanate, the foam-forming formulation also contains an organic compound containing at least 1.8 or more isocyanate-reactive groups per molecule (an isocyanate-reactive compound). Suitable such compounds include polyols, polyamines, polyacids, polymercaptans and like compounds. Preferred isocyanate-reactive compounds are the polyester and polyether polyols. Particularly preferred are polyester polyols or mixtures of polyester and polyether polyols.

The polyester polyols are prepared by known procedure from a polycarboxylic acid or acid derivative, such as an anhydride or ester of the polycarboxylic acid, and a polyhydric alcohol. The acids and/or alcohols may, of course, be used as mixtures of two or more compounds in the preparation of the polyester polyols. Particularly suitable polyester polyols are aromatic polyester polyols containing phthalic acid residues.

The polycarboxylic acid component, which is preferably dibasic, may be aliphatic, cycloaliphatic, aromatic and/or heterocyclic and may optionally be substituted, for example, by halogen atoms and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

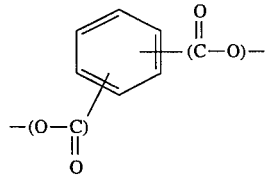

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted to polyester polyols through conventional tranesterification or esterification procedures.

The polyester polyols are prepared from the above described polycarboxylic acid components and any suitable polyhydric alcohol. The polyols can be aliphatic, cycloaliphatic, aromatic and/or heterocyclic, and advantageously are selected from the group consisting of diols, triols and tetrols. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_uH_{2u}(OH)_2$ or polyglycols distinguished by intervening ether linkages in the hydrocarbon chain, as represented by the general formula $C_uH_{2u}O_x(OH)_2$. In a preferred embodiment of the invention, the glycol is a low molecular weight aliphatic diol of the generic formula:

$$HO-R_2-OH$$

wherein $R^2$ is a divalent radical selected from the group consisting of:

(a) alkylene radicals each containing from 2 through 6 carbon atoms, and (b) radicals of the formula:

$$-(R^3O)_v-R^3-$$

wherein $R^3$ is an alkylene radical containing from 2 through 6 carbon atoms, and v is an integer of from 1 through 4, and (c) mixtures thereof.

Included among the suitable polyhydric alcohols are the following: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethyl-cyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

While the polyester polyols can be prepared from substantially pure reactant materials, more complex ingredients are advantageously used, such as sidestream, waste or scrap residues from the manufacture of phthalic acid, terephthalic acid, dimethyl terephthalate, polyethylene terephthalate, adipic acid and the like. Suitable polyol sidestream sources include ethylene glycol, diethylene glycol, triethylene glycol and higher homologs or mixtures thereof. The similar homologous series of propylene glycols can also be used.

Glycols can also be generated in situ during preparation of the polyester polyols by depolymerization of polyalkylene terephthalates. For example, polyethylene terephthalate yields ethylene glycol.

Other polyols which can be employed alone or in combination with polyester polyols in the preparation of the filled polyurethane and polyisocyanurate foam compositions of the invention include monomeric polyols and polyether polyols. The polyether polyols include the linear and branched chain polyethers which have a plurality of acylic ether oxygens and contain at least 1.8 isocyanate-reactive groups and preferably 3 or more (e.g., 4–8). The polyethers typically have molecular weights, based on their hydroxyl value, ranging from 250 to 7500. The polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide, tetrahydrofuran, styrene oxide, epichlorohydrin, optionally as mixtures or successively, preferably propylene oxide, ethylene oxide or mixed propylene oxide and ethylene oxide.

A wide variety of initiators may be alkoxylated to form useful polyether polyols. Examples of such starting components include ethylene glycol, 1,2- or 1,3-propanediol, 1,2-,1,3-, or 1,4-butanediol, polyethylene glycol, polypropylene glycol, hexanetriol, glycerine, sorbitol, trimethylolpropane, pentaerythritol, sucrose and other carbohydrates, 4,4-dihydroxydiphenylpropane, aniline, 2,4- or 2,6-diaminotoluene, ammonia, monoethanolamine, diethanolamine, triethanolamine, and ethylene diamine.

The polyurethane foams can be prepared by reacting the polyol and polyisocyanate on a 0.7:1 to 1.1:1 equivalent basis. In an advantageous embodiment of the invention wherein the polyester polyols are combined with another polyol(s) to produce polyurethane foams, the polyester polyols can comprise about 5 to 100, preferably about 5 to 75, and more preferably about 20 to 50, weight percent of the total polyol content in the foam preparations. The polyisocyanurate foams of the invention are advantageously prepared by reacting the polyisocyanate with a minor amount of polyol, such as sufficient polyol to provide about 0.10 to 0.70 hydroxyl equivalents of polyol per equivalent of said polyisocyanate, wherein the polyester polyol suitably comprises about 5 to 100, and preferably about 50 to 100, weight percent of the total polyol content in the foam preparations.

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. Hydrocarbons and halohydrocarbons are preferred liquids.

The hydrogen atom-containing blowing agents, which can be used alone or as mixtures with each other or other co-blowing agents, can be selected from a broad range of materials, including partially halogenated hydrocarbons, ethers, and esters, hydrocarbons, esters, ethers and the like. Among the usable hydrogen-containing halocarbons are 1,1-dichloro-1-fluoroethane (HCFC-141b), 1,1-dichloro-2,2,2-trifluoroethane (HCFC-123), monochlorodifluoromethane (HCFC-22), 1-chloro-1,1-difluoroethane (HCFC-142b), 1,1-difluoroethane (HCFC-152a), 1,1,1,2-tetrafluoroethane (HFC- 134a), 1,1,1,4,4,4-hexafluorobutane (HFC-356), 1,1,1,4,4-pentafluorobutane (HFC-365), 1,1,2,2,3,3-hexafluoropropane (HFC-236c,a), 1,1,1,2,3,3-hexafluoropropane (HFC-236e,a), pentafluoroethane (HFC-125), methyl-1,1,1-trifluoroethylether (HFE-263), difluoromethyl-1,1,1-trifluoroethylether (HFE-245), 1,1,2,2,3-pentafluoropropane (HFC- 245c,a), 1,1,1,2,3-pentafluoropropane (HFC-245e,b), 1,1,1,3,3-pentafluoropropane (HFC-245f,a), n-pentane, isopentane, cyclopentane, 2-methylbutane, methylene chloride, methyl formate, ethyl formate, methyl ether, ethyl ether, and isopropyl ether.

A preferred method for the production of froth foams of the invention is disclosed in U.S. Pat. No. 4,572,865, whose disclosure is hereby incorporated by reference. In this method, the froth-forming blowing agent can be any material which is inert to the reactive ingredients and easily vaporized at atmospheric pressure. This frothing agent advantageously has an atmospheric boiling point of −50° C. to 10° C. In a desirable embodiment of the invention, a higher boiling blowing agent is used in conjunction with the frothing agent. The former blowing agent advantageously has an atmospheric boiling point ranging from about 10° to 80° C.

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N, N'N'-tetramethyl-1,3-butanediamine, N,N-dimethylethanolamine, N, N-diethylethanolamine, and the like.

In the preparation of the polyisocyanurate rigid foams, any catalyst that will induce reaction of the isocyanate with the polyol and will induce isocyanurate ring formation can be employed in the foam preparations of the invention. Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine or N,N-dimethylethanolamine as well as 1,4-diazabicyclo [2.2.2] octane and organo tin compounds such as dibutyltin diacetate, stannous octoate and dibutyltin dilaurate.

The catalyst or catalyst mixture is used in a catalytically effective amount. Generally, the catalyst comprises from about 0.1 to 20 and preferably from about 0.3 to 10 weight percent of the total foam-forming composition.

Any suitable surfactant can be employed in the foaming step of the invention. Successful results have been obtained with silicone/ethylene oxide/propylene oxide copolymers as surfactants. Examples of surfactants useful in the present invention include, among others, polydimethylsiloxane-poly-oxyalkylene block copolymers available from OSi Specialties, Inc under the trade names "Y-10222", "Y-10764", "L-5420", and "L-5340", from the Dow Corning Corporation under the trade names "DC-193" and "DC-5315", and from Goldschmidt Chemical Corporation under the tradenames "B-8408" and "B-8407". It has been found that surfactants such as Y-10764 can contribute significantly to an increase in foam insulation value. Other suitable surfactants are those described in U.S. Pat. Nos. 4,365,024 and 4,529,745. Generally, the surfactant comprises from about 0.05 to 10, and preferably from 0.1 to 6, weight percent of the foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate and a mixture of β-chloropropyl phosphate esters with isomeric chloropropyl groups wherein the isopropyl structure predominates, co-dispersing agents, plasticizers, mold release agents, antioxidants, and compatibility agents. The use of such additives is well known to those skilled in the art.

The polyisocyanurate and polyurethane foams can be prepared by mixing together the organic polyisocyanate with the isocyanate-reactive compound (e.g., polyol) and other foam-forming ingredients as required, including the filler and dispersing agent, at temperatures ranging from about 0° C. to 150° C. Any order of mixing is acceptable provided that the filler is homogeneously blended into the foam-forming formulation and the reaction of the polyisocyanate and isocyanate-reactive compound does not begin until all components are mixed. In a preferred embodiment, the dispersing agent is employed to form a uniform dispersion of the filler in the isocyanate, this dispersion is thoroughly mixed with the blowing or foaming agent and surfactant to form the A-component, and then the A-component is combined with the remaining components, whereupon the total mixture is foamed.

The foams may be produced by discontinuous or continuous processes, with the foaming reaction and subsequent curing being carried out in molds or on conveyors. The foam product may be suitably produced as a foam laminate by (a) contacting at least one facing sheet with the form-forming mixture, and (b) foaming the mixture. The process is advantageously conducted in a continuous manner by depositing the foam-forming mixture on a facing sheet(s) being conveyed along a production line, and preferably placing another facing sheet(s) on the deposited mixture. The deposited foam-forming mixture is conveniently thermally cured at a temperature from about 20° C. to 150° C. in a suitable apparatus, such as an oven or heated mold. Both free rise and restrained rise processes, such as disclosed in U.S. Pat. No. 4,572,865, may be employed in the foam production.

Any facing sheet previously employed to produce foam laminates can be employed in the present invention. Examples of suitable facing sheets include, among others, those of kraft paper, aluminum, asphalt impregnated felts, and glass fiber mats as well as combinations of two or more of the above.

The foam materials of the invention can also be used, with or without a racer(s), for pipe insulation, pour-in-place applications, bunstock, spray foam and the like.

The invention is further illustrated by the following examples in which all parts and percentages are by weight unless otherwise indicated.

EXAMPLE 1

This example illustrates the evaluation of various dispersants for their compatibility with polyisocyanates. Mixture Nos. 1–12 of Table 1 below were prepared from each combination of a polyisocyanate and dispersant presented in the table. The dispersant was added to the isocyanate at a 1.2% level and the two components were thoroughly mixed. After storage overnight at ambient temperature, the viscosity of each mixture was determined. The results are shown in Table 1.

TABLE 1

Compatibility of Dispersant/Polyisocyanate Mixtures

| Mixture No. | Dispersant/Polyisocyanate | Evaluation |
| --- | --- | --- |
| 1 | Solsperse 13940[1]/Mondur MR[8] | cloudy & gelling |
| 2 | Nuosperse 657[2]/Mondur MR[8] | fluid |
| 3 | Witcamide 511[3]/Mondur 577[9] | fluid |
| 4 | Witcamide 5138[4]/Mondur 577[9] | gelling |
| 5 | Solsperse 13940[1]/Mondur 577[9] | gelling |
| 6 | Nuosperse 657[2]/Mondur 577[9] | cloudy & fluid |
| 7 | Pelron 344[5]/Mondur MR[8] | fluid |
| 8 | Pelron 344[5]/Mondur 577[9] | fluid |
| 9 | Solsperse 17940[6]/Mondur MR[8] | cloudy & gelling |
| 10 | Solsperse 17940[6]/Mondur 577[9] | cloudy & gelling |
| 11 | FC 430[7]/Mondur MR[8] | fluid |
| 12 | FC 430[7]/Mondur 577[9] | fluid |

[1]Solsperse 13940 = polymeric hyperdispersant supplied by Zeneca Inc.
[2]Nuosperse 657 = polymeric dispersant and stabilizing agent supplied by Hüls America.
[3]Witcamide 511 = fatty alkanolamide supplied by Witco Chemical Company.
[4]Witcamide 5138 = fatty alkanolamide supplied by Witco Chemical Company.
[5]Pelron 344 = acetate capped ethoxylated nonyl phenol supplied by Elé/Pelron.
[6]Solsperse 17940 = polymeric hyperdispersant supplied by Zeneca Inc.
[7]FC 430 = fluoroaliphatic polymeric ester supplied by Minnesota Mining and Manufacturing Company.
[8]Modur MR = polymethylene polyphenyl isocyanate having an equivalent weight of about 133 and a viscosity of about 150–250 cps at 25° C. (supplied by Bayer Corporation).
[9]Modur 577 = Polymethylene polyphenyl isocyanate having an equivalent weight of about 145 and a viscosity of about 500–800 cps at 25° C. (supplied by Bayer Corporation).

EXAMPLE 2

This example illustrates the use of different dispersants in the preparation of ground mixtures of a polyisocyanate and carbon black.

Each of Mixture Nos. 1–3 of Table 2 below were hand stirred in a ½ gal can. The resulting premixes were then milled using a high-speed disk disperser (Hockmeyer). Each mixture was ground for 1 ½ hours.

Hegman readings revealed that the grinding efficiency was greatest for Mixture No. 1, with Mixture No. 2 a very close second. However, while both Mixture Nos. 1 and 3 exhibited a considerable increase in viscosity after storage for 24 hours, the viscosity of Mixture No. 2 remained about the same after the storage.

TABLE 2

Dispersant Mixtures

| Mixture No. 1 | | Mixture No. 2 | |
|---|---|---|---|
| Ingredients | Parts | Ingredients | Parts |
| Mondur 577[1] | 1000.7 | Mondur 577[1] | 963.7 |
| Raven 410[2] | 136.5 | Raven 410[2] | 131.4 |
| Nuosperse 657[3] | 6.8 | Pelron 344[4] | 6.6 |

| Mixture No. 3 | |
|---|---|
| Ingredients | Parts |
| Mondur 577[1] | 941.7 |
| Raven 410[2] | 128.4 |
| Witcamide 511[5] | 6.5 |

[1]Of Example 1.
[2]Raven 410 = carbon black supplied by Columbian Chemicals Company.
[3]Of Example 1.
[4]Of Example 1.
[5]Of Example 1.

EXAMPLE 3

This example illustrates the use of a fluorochemical additive to reduce the viscosity of a carbon black/isocyanate dispersion.

A dispersion (Mixture No. 1) of 12% carbon black (Raven 410) and 10% dispersant (Pelron 344) in a polyisocyanate (Mondur 577) was prepared in the manner described in Example 2. A sample of Mixture No. 1 was thoroughly mixed with 0.1% fluorochemical additive (FC 430) to form Mixture No. 2, and with 0.1% of the fluorochemical additive and 2.7% propylene carbonate to form Mixture No. 3. Viscosity measurements made on each of Mixture Nos. 1–3 at 75° F. by means of a Brookfield (RVT) viscometer (spindle are shown in Table 3 below. The table also shows the % reduction in viscosity for Mixture Nos. 2 and 3 from the values determined for Mixture No. 1 at each RPM setting.

TABLE 3

Viscosity of Dispersions

| | Mixture No. 1[2] | Mixture No. 2[3] | |
|---|---|---|---|
| RPM[1] | Viscosity (cps) | Viscosity (cps) | % Reduction |
| 1 | 77,500 | 54,000 | 30 |
| 2.5 | 44,800 | 32,800 | 27 |
| 5 | 30,000 | 22,400 | 25 |
| 10 | 21,250 | 16,000 | 25 |
| 20 | 15,800 | 11,750 | 26 |
| 50 | 10,400 | 8,440 | 19 |
| 100 | 8,600 | 6,820 | 21 |

| Mixture No. 3[4] | | |
|---|---|---|
| RPM[1] | Viscosity (cps) | % Reduction |
| 1 | 20,000 | 74 |
| 2.5 | 13,000 | 71 |
| 5 | 9,500 | 68 |
| 10 | 7,100 | 55 |
| 20 | 5,450 | 66 |

TABLE 3-continued

Viscosity of Dispersions

| Mixture No. 1[2] | | Mixture No. 2[3] |
|---|---|---|
| 50 | 4,250 | 59 |
| 100 | 3,550 | 59 |

[1]RPM = revolutions per minute.
[2]Mixture No. 1 = Mondur 577 + Raven 410 + Pelron 344.
[2]Mixture No. 2 = Mondur 577 + Raven 410 + Pelron 344 + FC 430.
[2]Mixture No. 3 = Mondur 577 + Raven 410 + Pelron 344 + FC 430 + propylene carbonate.

EXAMPLE 4

This example illustrates (a) the preparation of carbon black/isocyanate dispersions with the use of a fluorochemical additive and (b) the manufacture of rigid polyurethane foam products from the dispersions.

A. DISPERSION OF CARBON BLACK IN ISOCYANATE

A high speed impingement mill (Kinetic Dispersions' Kady Mill) was charged with 33 lbs of isocyanate (Mondur 577). The isocyanate was heated by agitation for approximately 10 minutes to a temperature of 100° F. At this point, ethoxylated nonyl phenol (Pelron 344) was added and mixing was continued for 30 seconds. Carbon black pellets (Raven 410) were then added and the frequency of agitation was increased. Mixing was continued for about 70 minutes until a Hegman grind level of 6–7 was achieved.

The above carbon black/isocyanate dispersion was used to prepare A-components according to the formulations shown in Table 4 below for Comparative Foam A and Inventive Foams B and C. Each A-component mixture is the same except that the inventive mixtures were formulated to include 0.1% fluorochemical additive (FC 430) for Inventive Foam B and 0.1% of the fluorochemical and 2.5% propylene carbonate (Arcol 5000) for Inventive Foam C, both weight percents based on the weight of the total A-component mixture. The additions of the fluorochemical and of the fluorochemical and propylene carbonate to each respective carbon black/isocyanate dispersion were accomplished in a Hockmeyer high-speed disk disperser, with the ingredients being agitated for about ten minutes. The viscosity of each A-component is presented in the table.

B. FOAM PRODUCTION

A Hennecke high pressure foam machine was employed in the foam production. The A- and B-components were mixed together in the machine's mixhead and were dispensed into a temperature controlled Bosch mold. Operating temperatures were 90° F. for the A-component, 70° F. for the B-component, and 120° F. for the mold.

Characteristics of the foams produced are shown in Table 4. As can be seen from the data in the table, the use of the fluorochemical additive improves the flowability of the carbon black dispersion and the initial and aged insulation values of the foams.

TABLE 4

PRODUCTION OF POLYURETHANE FOAMS

| INGREDIENTS | FOAMS | | |
|---|---|---|---|
| (pts. by wt.) | A | B | C |
| A-Component | | | |
| Mondur 577[1] | 110.2 | 110.2 | 110.2 |

TABLE 4-continued

PRODUCTION OF POLYURETHANE FOAMS

| INGREDIENTS | FOAMS | | |
|---|---|---|---|
| (pts. by wt.) | A | B | C |
| Raven 410[2] | 9.7 | 9.7 | 9.7 |
| Pelron 344[3] | 1.0 | 1.0 | 1.0 |
| FC 430[4] | — | 0.13 | 0.13 |
| Propylene carbonate | — | — | 3.10 |
| B-Component | | | |
| Polyol E 9196[5] | 40.11 | 40.11 | 40.11 |
| Polyol PS 2502A[6] | 18.12 | 18.12 | 18.12 |
| Polyol E 9181[7] | 6.47 | 6.47 | 6.47 |
| Surfactant DC 5357[8] | 2.10 | 2.10 | 2.10 |
| PMDETA[9] | 1.05 | 1.05 | 1.05 |
| Dimethylaminopropyl cyclohexyltriazine | 0.53 | 0.53 | 0.53 |
| Water | 0.62 | 0.62 | 0.62 |
| HCFC 141b | 31.0 | 31.0 | 31.0 |
| A-Component Viscosity @ 75° F., cps | 5,000 | 4,500 | 3,500 |
| FOAM PROPERTIES | | | |
| Reactivity, C/G/T, sec | 9/44/60 | 9/43/60 | 9/43/58 |
| Minimum Fill Density, pcf | 2.07 | 2.07 | 2.04 |
| Panel Density, pcf | 2.27 | 2.23 | 2.24 |
| % Overpack | 9.5 | 8.1 | 9.3 |
| Core Density, pcf | 2.11 | 2.10 | 2.00 |
| Surface | Excellent | Excellent | Excellent |
| F.S. Rating, 1–5, best-worst | 2.0 | 2.0 | 2.0 |
| k-Factor, Anacon-Btu-in/hr ft[2]° F. | | | |
| Initial | 0.112 | 0.109 | 0.111 |
| 1 Month | 0.128 | 0.120 | 0.125 |
| 3 Months | 0.144 | 0.130 | 0.136 |

[1]Of Example 1.
[2]Of Example 2.
[3]Of Example 1.
[4]Of Example 1.
[5]Polyol E 9196 = sucrose/EO,PO polyol having a hydroxyl number of 470 supplied by Bayer Corporation.
[6]Polyol PS 2502A = phthalic anhydride/diethylene glycol polyol having a hydroxyl number of 250 supplied by Stepan Company.
[7]Polyol E 9181 = ethylenediamine/EO,PO polyol having a hydroxyl number of 770 supplied by Bayer Corporation.
[8]Surfactant DC 5357 = silicone surfactant supplied by Air Products and Chemicals, Inc.
[9]PMDETA = pentamethyldiethylenetriamine.

We claim:

1. A process for the manufacture of a closed cell, rigid, polymer foam from polymer foam-forming ingredients containing a filler which comprises:

(a) dispersing the filler in at least a portion of the foam-forming ingredients to form a filled dispersion, a non-ionic fluorochemical surfactant being incorporated in the foam-forming ingredients either before, during or after the dispersing operation to form a dispersion containing a filler and a fluorochemical surfactant, (b) mixing the dispersion formed in step (a) with any remaining foam-forming ingredient or ingredients, and (c) foaming and curing the resultant foam-forming composition, wherein the non-ionic fluorochemical surfactant has the formula of $R_f$—X wherein $R_f$ is a fluorocarbon group and X is a group which makes the surfactant soluble in the foam-forming ingredients.

2. The process of claim 1 wherein the foam-forming ingredients comprise a mixture for forming a polymer foam selected from the group consisting of polyurethane and polyisocyanurate foams.

3. The process of claim 1 wherein the fluorochemical surfactant is a fluoroaliphatic polymeric ester.

4. The process of claim 1 wherein the fluorochemical surfactant is present in an amount of from about 0.5 to 10 % by weight, based upon the weight of the filler.

5. The process of claim 1 wherein the filler is carbon black.

6. The process of claim 1 wherein the filler is present in an amount of from about 0.05 to 25% by weight, based upon the weight of the polymer material.

7. The process of claim 1 wherein the foam-forming ingredients include at least one additive selected from the group consisting of viscosity reducers, flame retardants, additional dispersing agents, plasticizers, mold release agents, antioxidants, compatibility agents and processing aids.

8. The process of claim 1 wherein the foam-forming ingredients include a hydrogen-containing blowing agent selected from the group consisting of 1,1-dichloro-1-fluoroethane, monochlorodifluoromethane, 1-chloro-1,1-difluoroethane, 1,1-difluoroethane, 1,1,1,2-tetrafluoroethane, 1,1,1,4,4,4-hexafluorobutane, 1,1,1,4,4-pentafluorobutane, difluoromethyl-1,1,1-trifluoroethylether, 1,1,2,2,3-pentafluoropropane, 1,1,1,2,3-pentafluoropropane, 1,1,1,3,3-pentafluoropropane, n-pentane, isopentane, cyclopentane, and mixtures thereof.

9. The process of claim 1 wherein the foam-forming ingredients comprise a polyisocyanate, an isocyanate-reactive compound, a blowing agent, the filler and fluorochemical surfactant, and the dispersion formed in step (a) contains, in addition to the filler and fluorochemical surfactant, the polyisocyanate, the isocyanate-reactive compound or both the polyisocyanate and isocyanate-reactive compound.

10. The process of claim 9 wherein the isocyanate-reactive compound comprises a member selected from the group consisting of a polyether polyol, a polyester polyol and mixtures thereof.

11. The process of claim 9 wherein the foam-forming ingredients further comprise a catalyst and a silicone surfactant.

12. The process of claim 1 wherein the foam-forming ingredients comprise a polyisocyanate, an isocyanate-reactive compound selected from the group consisting of a polyether polyol, a polyester polyol and mixtures thereof, a blowing agent, a catalyst, a silicone surfactant, and the filler and fluorochemical surfactant, and the dispersion formed in step (a) contains, in addition to the filler and fluorochemical surfactant, the polyisocyanate, the isocyanate-reactive compound or both the polyisocyanate and isocyanate-reactive compound.

13. The process of claim 12 wherein the foam-forming ingredients further comprise an additional dispersing agent which is contained in the dispersion formed in step (a).

14. The process of claim 12 wherein the fluorochemical surfactant is a fluoroaliphatic polymeric ester.

15. The process of claim 12 wherein the filler is present in an amount of from about 0.05 to 25% by weight, based upon the weight of the polymer material.

16. The process of claim 12 wherein the filler is carbon black.

17. The process of claim 16 wherein the carbon black is present in an amount of from about 2 to 10% by weight, based upon the weight of the polymer material.

\* \* \* \* \*